J. ZIEGLER.
COMBINATION TOOL.
APPLICATION FILED NOV. 15, 1918.

1,353,445.

Patented Sept. 21, 1920.

J. Ziegler, Inventor

Witness

By C. A. Snow & Co., Attorneys

UNITED STATES PATENT OFFICE.

JACOB ZIEGLER, OF COFFEYVILLE, KANSAS.

COMBINATION-TOOL.

1,353,445.  Specification of Letters Patent.  Patented Sept. 21, 1920.

Application filed November 15, 1918. Serial No. 262,677.

*To all whom it may concern:*

Be it known that I, JACOB ZIEGLER, a citizen of the United States, residing at Coffeyville, in the county of Montgomery and State of Kansas, have invented a new and useful Combination-Tool, of which the following is a specification.

The subject of this invention is a combination tool designed to be used as a wrench, pipe wrench, expansion pliers or hand vise.

The main object of the invention is the provision of a tool having a movable jaw and means for further adjusting the jaw when the tool is gripped.

The invention also contemplates generally improving the construction and enhancing the utility of combination tools.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical structure for carrying out the invention is shown in the accompanying drawing, wherein:—

Figure 1:
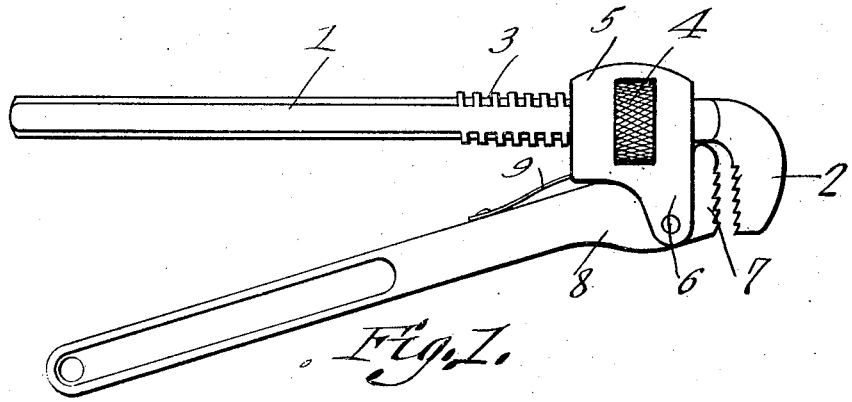
Figure 1 is a view in side elevation of the device.
Figure 2:
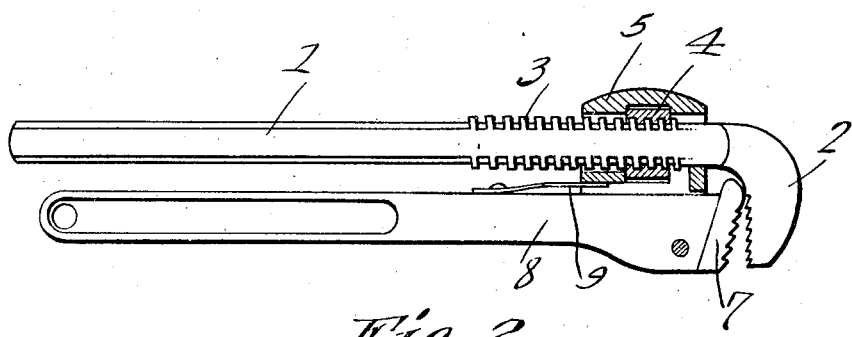
Fig. 2 is a view in side elevation, partly in section, showing the device in closed or operative position.

Referring to the drawing by numerals of reference:—

The tool embodies a shank or handle 1, formed with an integral jaw at one end thereof, as indicated by the numeral 2. A portion of the handle 1 adjacent the jaw 2 is threaded to receive a knurled thumb-nut 4, which is positioned in a slot formed in a collar 5 which encircles the handle 1 and is slidable longitudinally thereof. Rotation of the thumb-nut will, because of the threads, cause the nut and collar to travel back or forth on the handle.

The collar 5 is formed with extending ears 6 between which a movable jaw 7 is pivotally secured, the jaw being provided with a preferably integral shank or handle 8.

A resilient element, such as the leaf spring 9 is secured to the handle or shank 8 and has one end extending between the ears 6 and engaging the collar 5 to normally retain the shanks or handles 1 and 8 in extended or separated position.

The operation is as follows:—The jaws are brought to proper position to receive the work by moving the collar through the nut 4 so as to bring the jaw 7 in proper relation to the jaw 2. When the jaws are in place about the work, gripping the handles will, by the pivotal movement of the handle 8, bring the jaws more tightly against the work and grip the same more firmly.

Having described the invention, what is claimed as new is:—

In a device of the class described, a shank provided at one end with a laterally projecting fixed jaw and having threads at the rear of the jaw; a collar inclosing the shank and having laterally extended ears; a nut journaled in the collar and engaging the threads; and a handle substantially equal in length to the shank and pivotally supported close to its outer edge on the ears independently of the nut at a point close to the outer ends of the ears, the handle terminating in a movable jaw coacting with the fixed jaw when the handle and the shank move toward each other.

In testimony that I claim the foregoing as my own, I have hereto affixed my signature in the presence of two witnesses.

JACOB ZIEGLER.

Witnesses:
W. L. BAUSMAN,
E. C. WRIGHT.